US011138971B2

(12) United States Patent
Wetsel et al.

(10) Patent No.: US 11,138,971 B2
(45) Date of Patent: Oct. 5, 2021

(54) USING CONTEXT TO INTERPRET NATURAL LANGUAGE SPEECH RECOGNITION COMMANDS

(71) Applicant: Lenovo (Singapore) Pte. Ltd., Singapore (SG)

(72) Inventors: Peter Hamilton Wetsel, Raleigh, NC (US); Jonathan Gaither Knox, Morrisville, NC (US); Suzanne Marion Beaumont, Wake Forest, NC (US); Russell Speight VanBlon, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 508 days.

(21) Appl. No.: 14/097,954

(22) Filed: Dec. 5, 2013

(65) Prior Publication Data
US 2015/0161997 A1 Jun. 11, 2015

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01); *G10L 2015/228* (2013.01)

(58) Field of Classification Search
CPC .............. G10L 2015/228; G10L 15/22; G10L 2015/223; G06F 3/167
USPC ........................................................ 704/275
See application file for complete search history.

(56) References Cited

U.S. PATENT DOCUMENTS

| 6,570,588 B1* | 5/2003 | Ando .................... G06F 3/0481 715/728 |
| 6,839,669 B1 | 1/2005 | Gould et al. |
| 7,027,975 B1* | 4/2006 | Pazandak ............ G06F 16/3344 704/9 |
| 8,103,502 B1* | 1/2012 | Bangalore ............... G10L 15/24 704/249 |

(Continued)

FOREIGN PATENT DOCUMENTS

| CN | 1647023 A | 7/2005 |
| CN | 101297355 A | 10/2008 |

(Continued)

OTHER PUBLICATIONS

Colucci, Michael C., Non-Final Office Action for U.S. Appl. No. 14/259,672, dated Jan. 20 2016, 19 pages.

(Continued)

*Primary Examiner* — Michael Colucci
(74) *Attorney, Agent, or Firm* — Ference & Associates LLC

(57) ABSTRACT

An embodiment provides a method, including: receiving, at an audio receiver of an information handling device, user voice input; identifying, using a processor, words included in the user voice input; determining, using the processor, one of the identified words renders ambiguous a command included in the user voice input; accessing, using the processor, context data; disambiguating, using the processor, the command based on the context data; and committing, using the processor, a predetermined action according to the command. Other aspects are described and claimed.

18 Claims, 3 Drawing Sheets

(56) References Cited

U.S. PATENT DOCUMENTS

| | | | |
|---|---|---|---|
| 8,606,568 B1* | 12/2013 | Tickner | G10L 15/02 704/231 |
| 8,655,901 B1* | 2/2014 | Li | G06F 40/58 707/760 |
| 8,781,840 B2 | 7/2014 | Jaramillo et al. | |
| 9,100,694 B1 | 8/2015 | Chandel et al. | |
| 9,183,835 B2 | 11/2015 | Burke et al. | |
| 2001/0020837 A1 | 9/2001 | Yamashita et al. | |
| 2004/0056907 A1* | 3/2004 | Sharma | G06K 9/00335 715/863 |
| 2005/0075881 A1 | 4/2005 | Rigazio et al. | |
| 2006/0041564 A1* | 2/2006 | Jain | G06F 16/907 |
| 2007/0060118 A1 | 3/2007 | Guyette | |
| 2007/0061712 A1 | 3/2007 | Bodin et al. | |
| 2007/0088556 A1* | 4/2007 | Andrew | G10L 15/19 704/270.1 |
| 2007/0174057 A1 | 7/2007 | Genly | |
| 2008/0208864 A1 | 8/2008 | Cucerzan et al. | |
| 2010/0046842 A1 | 2/2010 | Conwell | |
| 2010/0184011 A1* | 7/2010 | Comerford | G10L 17/22 434/321 |
| 2011/0055256 A1 | 3/2011 | Phillips et al. | |
| 2011/0060587 A1* | 3/2011 | Phillips | G10L 15/30 704/235 |
| 2011/0283324 A1 | 11/2011 | Oh | |
| 2012/0117112 A1 | 5/2012 | Johnston et al. | |
| 2012/0166180 A1* | 6/2012 | Au | G06F 40/253 704/9 |
| 2012/0239661 A1 | 9/2012 | Giblin | |
| 2012/0265528 A1 | 10/2012 | Gruber et al. | |
| 2012/0278719 A1 | 11/2012 | Hwang et al. | |
| 2012/0316878 A1 | 12/2012 | Singleton et al. | |
| 2014/0068692 A1 | 3/2014 | Archibong et al. | |
| 2014/0081633 A1* | 3/2014 | Badaskar | G10L 15/26 704/235 |
| 2014/0122075 A1 | 5/2014 | Bak et al. | |
| 2015/0046418 A1 | 2/2015 | Akbacak et al. | |

FOREIGN PATENT DOCUMENTS

| | | |
|---|---|---|
| CN | 101432679 A | 5/2009 |
| CN | 102137085 A | 7/2011 |
| JP | 2008152580 A | 7/2008 |
| WO | 2012019028 A1 | 8/2012 |

OTHER PUBLICATIONS

Waltermann et al., Amendment filed in Response to the Non-Final Office Action for U.S. Appl. No.14/259,672, Apr. 20, 2016, 11pages.

Colucci, Michael C., Interview Summary for U.S. Appl. No. 14/259,672, dated May 9, 2016, 3 pages.

Waltermann et al., Supplemental Amendment for U.S. Appl. No. 14/259,672, dated May 13, 2016, 10 pages.

Colucci, Michael C., Final Office Action for U.S. Appl. No. 14/259,672, dated May 20, 2016, 30 pages.

Waltermann et al., Request for Continued Examination and Amendment for U.S. Appl. No. 14/259,672, dated Sep. 20, 2016, 14 pages.

Colucci, Michael C., Non-Final Office Action for U.S. Appl. No. 14/259,672, dated Nov. 7, 2016, 34 pages.

* cited by examiner

USING CONTEXT TO INTERPRET NATURAL LANGUAGE SPEECH RECOGNITION COMMANDS

BACKGROUND

Information handling devices ("devices"), for example laptop computers, tablets, smart phones, desktop computers, smart TVs, navigation devices, automobile consoles, etc., may be used to process speech inputs, e.g., received by an audio receiver such as a microphone. For example, speech recognition technology enables a device to transform spoken words into machine text, e.g., by converting a digital audio signal to a machine text word, for use in an underlying application, e.g., a word processing document, a search application, etc. Conventional improvements in speech recognition technology have primarily focused on accuracy of the recognition, i.e., accurately identifying the word or words actually spoken by the user.

BRIEF SUMMARY

In summary, one aspect provides a method, comprising: receiving, at an audio receiver of an information handling device, user voice input; identifying, using a processor, words included in the user voice input; determining, using the processor, one of the identified words renders ambiguous a command included in the user voice input; accessing, using the processor, context data; disambiguating, using the processor, the command based on the context data; and committing, using the processor, a predetermined action according to the command.

Another aspect provides an information handling device, comprising: an audio receiver; a processor; and a memory device storing instructions executable by the processor to: receive, at the audio receiver of an information handling device, user voice input; identify words included in the user voice input; determine one of the identified words renders ambiguous a command included in the user voice input; access context data; disambiguate the command based on the context data; and commit a predetermined action according to the command.

Another aspect provides a product, comprising: a storage device having code stored therewith, the code comprising: code that receives at an audio receiver of an information handling device, user voice input; code that identifies, using a processor, words included in the user voice input; code that determines, using the processor, one of the identified words renders ambiguous a command included in the user voice input; code that accesses, using the processor, context data; code that disambiguates, using the processor, the command based on the context data; and code that commits, using the processor, a predetermined action according to the command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
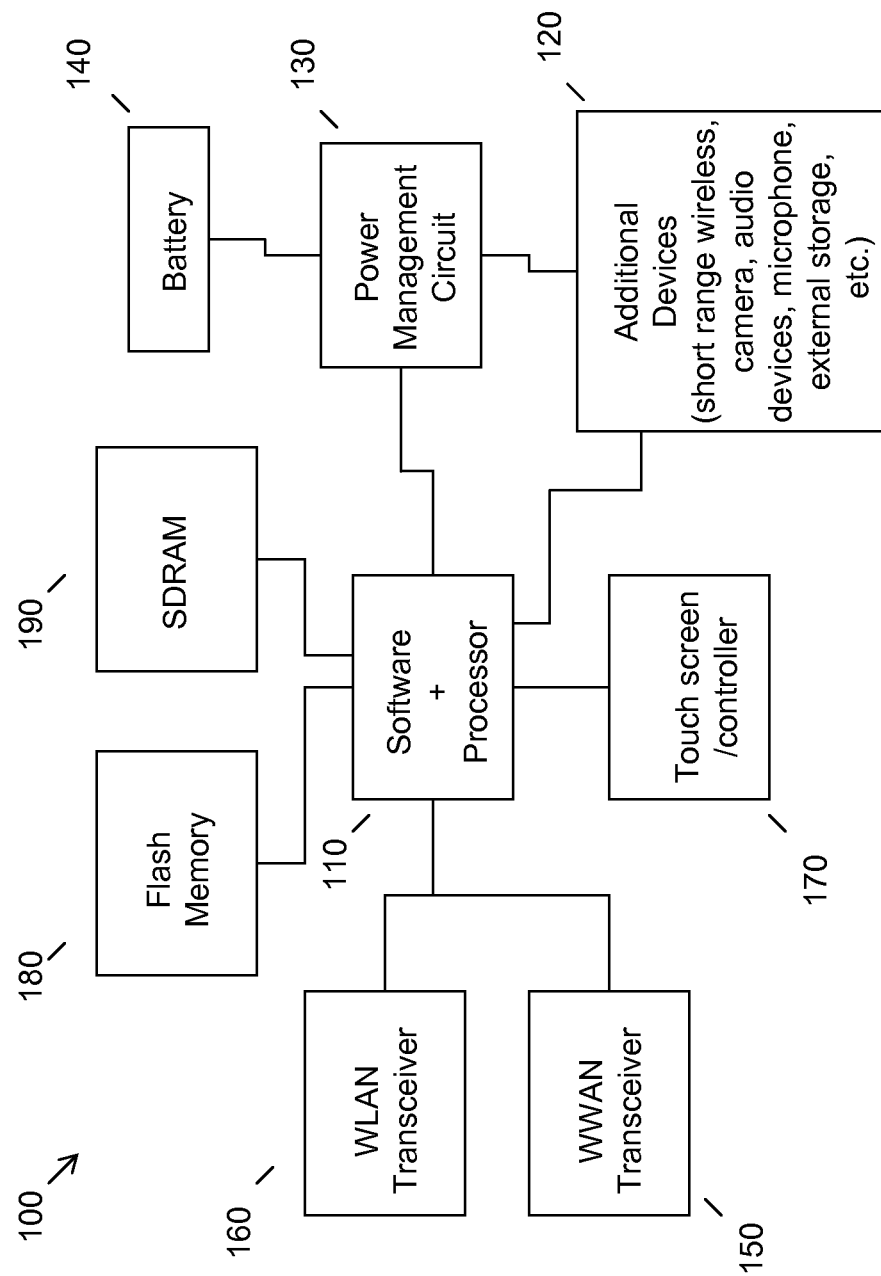
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Speech recognition technology is popular and used in connection with a variety of applications. For example, many device applications, e.g., Internet searching applications, word processing applications, communication applications (chat, email, SMS text, etc.) and the like may take voice input of the user, convert this voice input into a machine usable form (referred to herein as machine text—whether or not the voice signal is literally converted to text) for use by an application. For example, a user may provide a voice input command such as "send this file to my friend Jon".

Current speech recognition technology will faithfully and accurately identify this voice input. That is, conventional speech recognition will accurately determine that the user has literally spoken the words "send this file to my friend Jon". However, acting on this voice input in a way the user intends is another matter entirely. That is, the voice input must be parsed and understood in order for the device to execute an appropriate action, e.g., determining which file is "this" file, which destination is associated with "Jon", which mode of communication is to be used (e.g., email, text, etc.).

Accordingly, an embodiment provides mechanisms for using context to interpret natural language speech recognition commands. In an embodiment, various words of a command are identified, e.g., as conventionally known. An embodiment supplements the standard execution of preprogrammed or predetermined commands, e.g., using certain key words or trigger phrases, with the ability to identify the source of ambiguity within the command (i.e., that would normally render the command un-executable) along with an ability to leverage context data (from a variety of sources) that disambiguates the command such that it may be executed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a microphone, which may include physical elements that transforms sound waves into an electrical audio signal. Commonly, system 100 will include a touch screen 170 for data input and display/rendering. System 100 also typically includes various memory devices, for example flash memory 180 and SDRAM 190.

Figure 2:
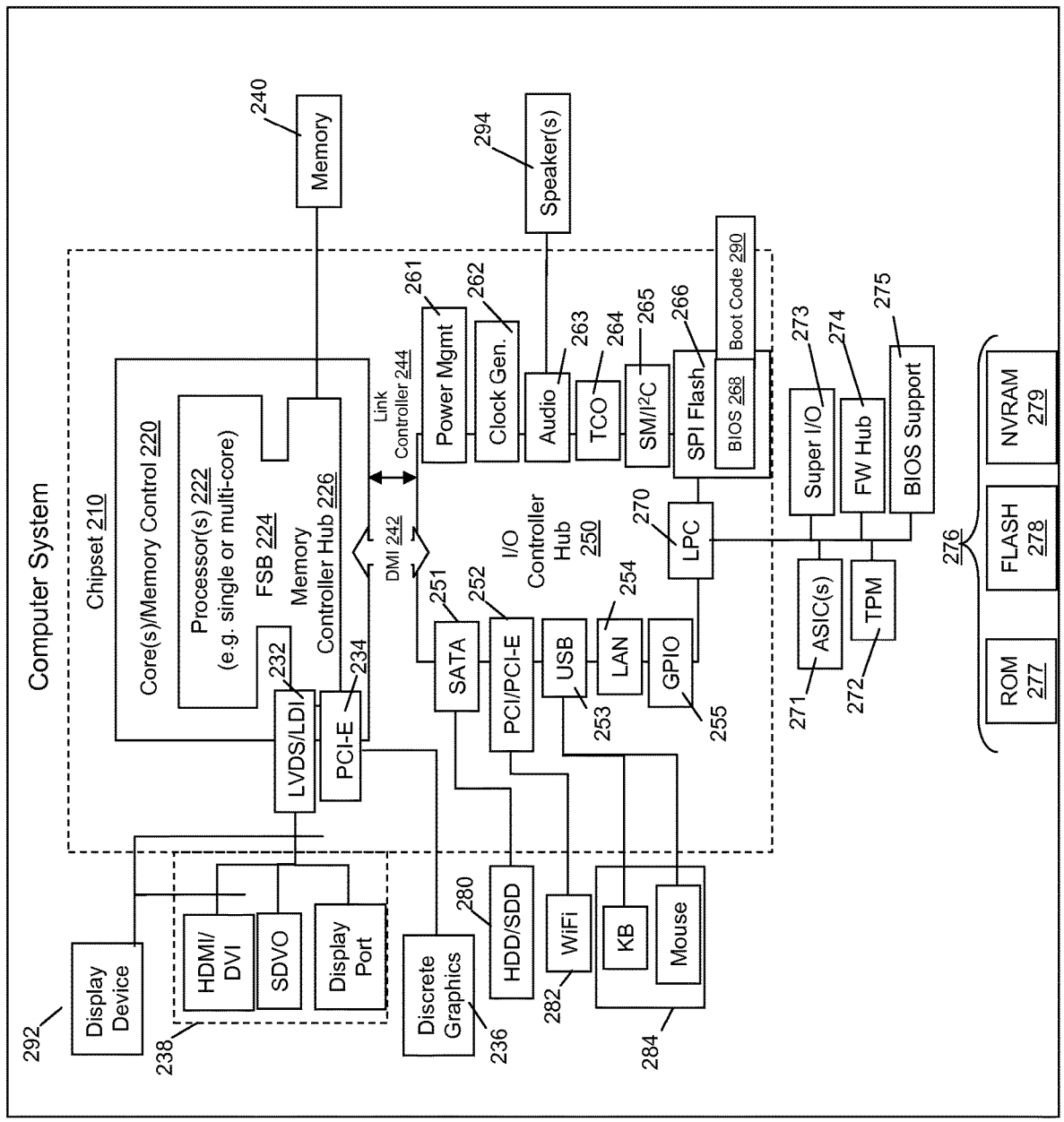
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that allow users to provide voice inputs, e.g., using microphones of the respective devices, that in turn may be utilized by applications running on the devices. In this respect, the device circuitry outlined in FIG. 1 and FIG. 2 may include, e.g., in device memory, speech recognition technology that identifies the word (or words) spoken by the user for use as input to commit actions (e.g., form machine text input; execute a command to control an application, etc.).

Figure 3:
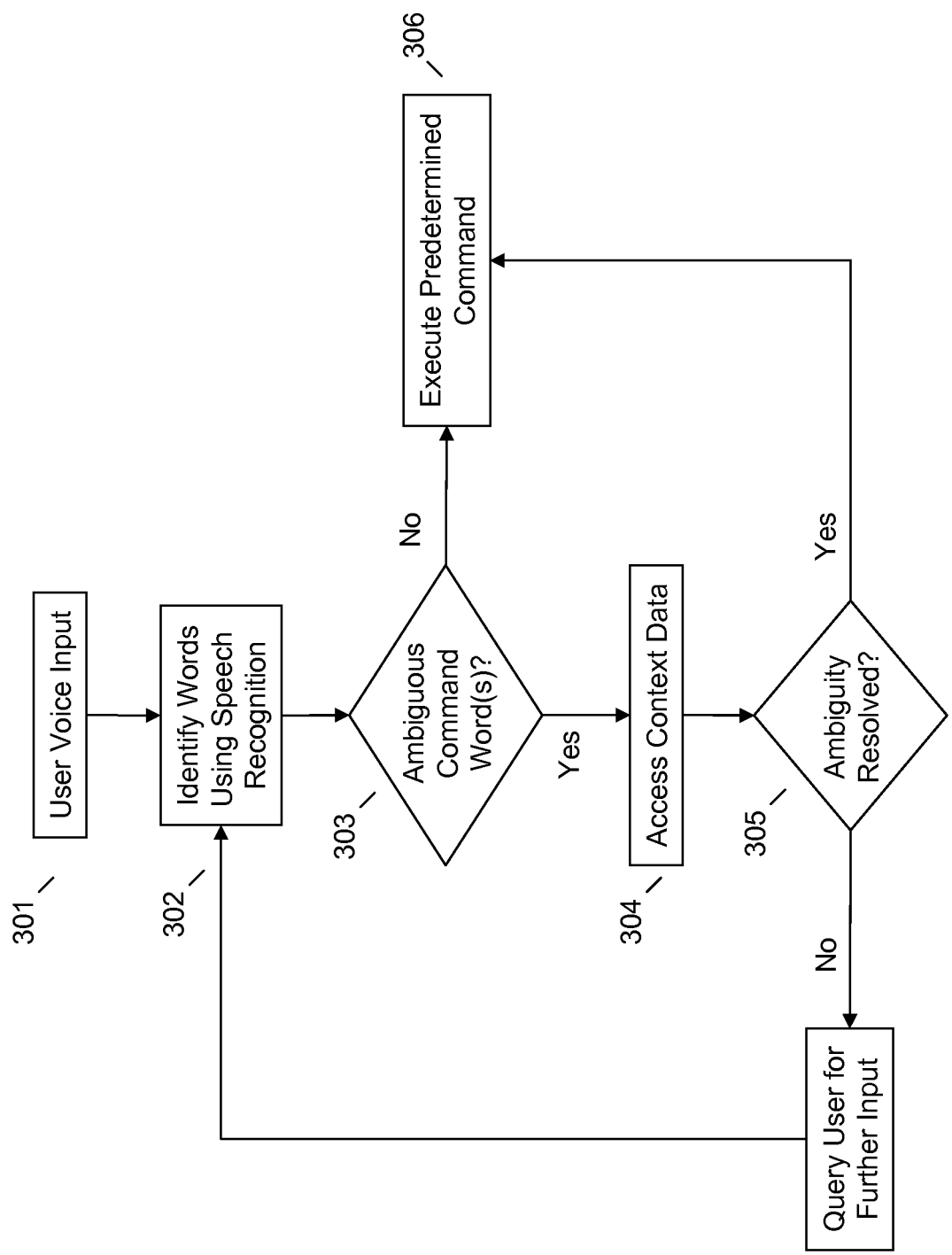
FIG. 3 illustrates an example method of using context to interpret natural language speech recognition commands.

FIG. 3 outlines an example method of using context to interpret natural language speech recognition commands. As illustrated, an embodiment receives user voice input at 301, e.g., via a microphone included in the device. This voice input may then be processed by a speaker recognition engine at 302 in order to accurately identify the literal input. For example, a user voicing the input "send this file to my friend Jon" will be recognized by the speech recognition engine at 302 as the literal input of "send", "this", "file", "to", "my", "friend" and "Jon".

While certain technology does exist for parsing and analyzing this string of inputs, i.e., "send", "this", "file", "to", "my", "friend" and "Jon", to identify a command, in this case a "send" command, the remaining words of the input, although accurately identified, are nonetheless ambiguous from the stand point of determining what to send to, e.g., which "file", to whom, e.g., which "Jon", and how, e.g., via email, SMS text, etc.

Accordingly, an embodiment permits these ambiguities in the user voice input to be disambiguated utilizing context, e.g., as found within the voice input itself, in other context data, or a combination of the foregoing. In this example, an embodiment identifies which of the identified words render the user voice input ambiguous. Given that the word "send" may be mapped to a command action, e.g., transferring a file, it may not be identified as a source of ambiguity.

However, the words "file" and "Jon" may be particularly problematic, as determined at 303. The identification of ambiguous words within the user voice input may itself leverage context data. For example, the word "send" may be omitted from the identified words causing ambiguity using a straight forward context analysis, e.g., "send" being mapped to a transfer command and the modality defaulting to the currently running application receiving the input, e.g., email application, SMS text application, etc.

On the other hand, other words may not be so easy to disambiguate and thus may be identified as the subject of further analysis using additional context, e.g., "file" and "Jon" in this example. Taking the word "Jon", being identified as a source of ambiguity at 303, an embodiment may leverage context data within the user voice input, i.e., "friend" to determine an additional source of context data, e.g., "friend" contacts on device. Thus, an embodiment access context data within the user voice input as well as outside of the user voice input, e.g., contacts lists and sub-groups thereof, at 304 in order to attempt disambiguation of the voice input and therefore identification of the appropriate command function to be executed.

Additionally, other context data may be utilized. In this example, the word "this" may be predetermined or default-identified as an ambiguous word and so identified at 303. The word "this" may therefore be used as a trigger event by which an embodiment accesses additional context data in an effort to interpret/disambiguate the word "this". It should be noted that other such words may be similarly handed and that the word "this" is used as one non-limiting example. For example, an embodiment may similarly disambiguate "these" as well as "this", e.g., in the case multiple files are selected to be sent, or multiple files were open, etc.

Therefore, given the identification at 303 of a source of ambiguity within the user voice input, e.g., "this", an embodiment accesses additional context data at 304 as is appropriate. In the example of the word "this", an embodiment may do an analysis of the context in which the word "this" appears within the user voice input, e.g., immediately preceding the word "file". Thus, context data (in this case derived from the user voice input itself) is utilized to determine an association between the words "file" and "this". This permits a further analysis, i.e., using context data related to "files".

In this regard, the context data accessed at 304 may include files that are known to be pertinent to the current situation, e.g., files currently open in applications, a file selected or highlighted in a running application, a recently used file or files, etc. Thus, a suspect list of "object(s)", i.e., data or files that may represent "this" file may be collected.

At 305 therefore, an embodiment may determine if the ambiguity has been resolved. For example, the ambiguity surrounding the word "Jon" may be determined as resolved by locating a single "Jon" within a group of contacts on the device located within a "personal" or "friends" sub-group. Alternatively, if only one "Jon" is located in the contacts, this ambiguity may be determined to be resolved at 305. Likewise, if only one file is selected or only one application having a file open is identified, the ambiguity regarding which file is "this" file may be determined to be resolved at 305.

Depending on the number of ambiguities to be resolved and/or the confidence level at which the ambiguities (or group thereof) have been resolved, an embodiment may thereafter execute or commit an action or command at 306. For example, if only one file is identified and only one Jon is identified, an embodiment may automatically commit a predetermined action corresponding to the voice input "send this file to my friend Jon". This may be accomplished, again based in part on a disambiguation analysis as described above or according to a predetermined default rule, for example choosing a likely transmission modality (e.g., it is probable to a degree of acceptable confidence that email is the preferred modality in this context, e.g., based on a user history of transmitting files of this type) or a predetermined rule regarding the modality (e.g., use SMS text messaging modality to send a picture file to a contact listing only a telephone number and not an email).

The disambiguation may take multiple voice inputs into account in resolving ambiguities, e.g., as appear in natural language voice commands. By way of example, if the user issuing the voice command "send this file to my friend Jon" had previously looked up a file, e.g., using the voice command "find the file named quarterlyearnings.ppt", an embodiment may leverage this previous voice input, saved e.g., as context data, in order to properly infer which file is "this" file. In this regard, the context may carry across applications and/or devices (e.g., active applications, machine state, etc.). Thus, a user voice command of "send this to everyone that was at the meeting yesterday" may, given that an embodiment may store as context data information for disambiguating "this" to locate a specific file, may also disambiguate the "everyone" as the people included in a calendar entry stored in a device calendar appointment "yesterday".

If an embodiment does not determine that the ambiguity has been resolved at 305, e.g., to a predetermined confidence threshold, an embodiment may query the user for further input. For example, if more than one contact named "Jon" is found in the friends sub-group of contacts, an embodiment may query the user for disambiguating input, e.g., selection from a list of contacts named Jon, querying for a last name, an address (or portion thereof) etc., prior to committing or executing the command. Of course, if no ambiguity is detected, an embodiment may execute the command without further delay at 306.

In resolving the ambiguity using the context data at 305, the disambiguating thus includes associating a context data item, e.g., contact list entry, with the identified word rendering the command ambiguous, e.g., Jon. The associating of these items may thus be considered a linking of a device object (e.g., the contact number or email of the contact "Jon") with the identified word rendering the command ambiguous using the context data item, e.g., "Jon". Given this linkage, an embodiment may essentially replace the identified word rendering the command ambiguous, e.g., "Jon", with a device object identifier, e.g., contact number, thus transforming the voice input into "send [file object identifier] to my friend [contact object identifier]" or specifically "send [file a] to [123-456-7890].

Therefore, an embodiment permits users to voice natural language commands, have the ambiguities within these natural language commands identified and resolved, such that the commands may be executed, with or without further user input (e.g., confirmation). As may be appreciated from the foregoing, an embodiment permits a user to continue using natural language voice inputs or commands with a minimal amount of failures with respect to the execution of corresponding commands or actions.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an audio receiver of an information handling device, user voice input;
   identifying, using a processor, a command included in the user voice input, wherein the command comprises at least one deictic word that renders the command ambiguous, wherein the at least one deictic word is a trigger event that prompts the processor to access context data found within the voice input;
   accessing, based on the trigger event and using the processor, the context data contained within the user voice input;
   disambiguating, using the processor, the command based on the context data, said disambiguating comprising using information contained within the context data to correlate the at least one deictic word with a single object selection or a multiple object selection; and
   automatically selecting, based on the disambiguating, one or more objects stored on the information handling device.

2. The method of claim 1, wherein the context data comprises data derived from the voice input.

3. The method of claim 2, wherein the data derived from the voice input includes an identified word included in the user voice input selected from the group of words consisting of a contact and an application name.

4. The method of claim 1, wherein:
   the at least one word of the identified words that renders the command ambiguous comprises a noun;
   the context data comprises data derived from a list of open applications on the information handling device; and
   the disambiguating comprises identifying a file associated with the noun based on the list of open applications on the information handling device.

5. The method of claim 1, wherein:
   the at least one word of the identified words that renders the command ambiguous comprises a noun;
   the context data comprises data derived from a list of most recently used applications on the information handling device; and
   the disambiguating comprises identifying a file associated with the noun based on the list of most recently used applications on the information handling device.

6. The method of claim 1, wherein:
the at least one word of the identified words that renders the command ambiguous comprises a noun;
the context data comprises data derived from a list of most recently used objects on the information handling device; and
the disambiguating comprises identifying a file associated with the noun based on the list of most recently used objects on the information handling device.

7. The method of claim 6, wherein the associating comprises linking a device object to the at least one word of the identified words that renders the command ambiguous using the context data.

8. The method of claim 7, further comprising replacing the at least one other word of the identified words with a device object identifier.

9. The method of claim 8, wherein the device object identifier is a file name pointing to the device object subject to the command.

10. An information handling device, comprising:
an audio receiver;
a processor; and
a memory device that stores instructions executable by the processor to:
receive, at the audio receiver of an information handling device, user voice input;
identify a command included in the user voice input, wherein the command comprises at least one deictic word that renders the command ambiguous, wherein the at least one deictic word is a trigger event that prompts the processor to access context data found within the voice input;
access, based on the trigger event, the context data contained within the user voice input;
disambiguate the command based on the context data by using information contained within the context data to correlate the at least one deictic word with a single object selection or a multiple object selection; and
automatically select, based on the disambiguating, one or more objects stored on the information handling device.

11. The information handling device of claim 10, wherein the context data comprises data derived from the voice input.

12. The information handling device of claim 11, wherein the data derived from the voice input includes an identified word included in the user voice input selected from the group of words consisting of a contact and an application name.

13. The information handling device of claim 10, wherein:
the at least one word of the identified words that renders the command ambiguous comprises a noun;
the context data comprises data derived from a list of open applications on the information handling device; and
the processor disambiguates the command by identifying a file associated with the noun based on the list of open applications on the information handling device.

14. The information handling device of claim 10, wherein:
the at least one word of the identified words that renders the command ambiguous comprises a noun;
the context data comprises data derived from a list of most recently used applications on the information handling device; and
the processor disambiguates the command by identifying a file associated with the noun based on the list of most recently used applications on the information handling device.

15. The information handling device of claim 10, wherein:
the at least one word of the identified words that renders the command ambiguous comprises a noun;
the context data comprises data derived from a list of most recently used objects on the information handling device; and
the disambiguating comprises identifying a file associated with the noun based on the list of most recently used objects on the information handling device.

16. The information handling device of claim 15, wherein the processor links a device object to the at least one word of the identified words that renders the command ambiguous using the context data.

17. The information handling device of claim 16, further comprising replacing the at least one word of the identified words with a device object identifier.

18. A product, comprising:
a storage device having code stored therewith, the code being executable by a processor and comprising:
code that receives at an audio receiver of an information handling device, user voice input;
code that identifies a command included in the user voice input, wherein the command comprises at least one deictic word that renders the command ambiguous, wherein the at least one deictic word is a trigger event that prompts the processor to access context data found within the voice input;
code that accesses, based on the trigger event and using the processor, the context data contained within the user voice input;
code that disambiguates, using the processor, the command based on the source of context data by using information contained within the context data to correlate the at least one deictic word with a single object selection or a multiple object selection; and
code that automatically selects, based on the code that disambiguates, one or more objects stored on the information handling device.

* * * * *